(12) United States Patent
Jeong et al.

(10) Patent No.: US 8,732,760 B2
(45) Date of Patent: May 20, 2014

(54) IPTV ACCESS CONTROL, PERSONALIZED ADVERTISEMENT, PERSONALIZED ELECTRONIC PROGRAM GUIDE PROVIDING METHOD AND SYSTEM USING FINGERPRINT SCANNER EQUIPPED SET-TOP BOX

(75) Inventors: Young Sic Jeong, Daejeon (KR); Shin Gak Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 148 days.

(21) Appl. No.: 12/897,864

(22) Filed: Oct. 5, 2010

(65) Prior Publication Data
US 2011/0113441 A1 May 12, 2011

(30) Foreign Application Priority Data
Nov. 11, 2009 (KR) .......................... 10-2009-0108467

(51) Int. Cl.
| | |
|---|---|
| H04N 5/445 | (2011.01) |
| H04H 60/45 | (2008.01) |
| H04N 7/16 | (2011.01) |
| H04N 7/10 | (2006.01) |
| H04N 7/173 | (2011.01) |

(52) U.S. Cl.
USPC .................. 725/46; 725/11; 725/25; 725/34; 725/131

(58) Field of Classification Search
None
See application file for complete search history.

(56) References Cited

U.S. PATENT DOCUMENTS

| | | | |
|---|---|---|---|
| 2003/0028872 A1* | 2/2003 | Milovanovic et al. | 725/12 |
| 2003/0237093 A1* | 12/2003 | Marsh | 725/46 |
| 2007/0220553 A1* | 9/2007 | Branam et al. | 725/46 |
| 2010/0263004 A1* | 10/2010 | Barton et al. | 725/106 |

FOREIGN PATENT DOCUMENTS

| | | |
|---|---|---|
| EP | 1 126 357 A2 | 8/2001 |
| JP | 2000-341662 | 12/2000 |
| JP | 2007-49322 | 2/2007 |
| JP | 4187722 | 9/2008 |
| KR | 2001-0108589 | 12/2001 |
| KR | 20-0369832 | 11/2004 |
| KR | 10-2007-0080761 | 8/2007 |
| KR | 10-0789516 A | 12/2007 |
| KR | 10-2009-0029356 | 3/2009 |

* cited by examiner

Primary Examiner — Chris Parry
(74) Attorney, Agent, or Firm — Rabin & Berdo, Jr.

(57) ABSTRACT

Provided is a personalized program providing method and system. The personalized program providing system may provide a view restriction, a personalized advertisement, or a personalized program guide using a set-top box including a fingerprint scanner. The personalized program providing system includes a set-top box to scan a fingerprint using a fingerprint scanner to identify identification information associated with a user and to transmit the identified identification information to an Internet TV service providing server, an Internet TV service providing server to transmit a personalized program guide corresponding to the transmitted identification information to the set-top box, and an Internet TV set to provide the transmitted personalized program guide.

11 Claims, 5 Drawing Sheets

IPTV ACCESS CONTROL, PERSONALIZED ADVERTISEMENT, PERSONALIZED ELECTRONIC PROGRAM GUIDE PROVIDING METHOD AND SYSTEM USING FINGERPRINT SCANNER EQUIPPED SET-TOP BOX

CROSS-REFERENCE TO RELATED APPLICATION

This application claims the benefit of Korean Patent Application No. 10-2009-0108467, filed on Nov. 11, 2009, in the Korean Intellectual Property Office, the disclosure of which is incorporated herein by reference.

BACKGROUND

1. Field of the Invention

The present invention relates to an Internet TV set providing a personalized program guide, a personalized advertisement, personal information, and personal identification.

2. Description of the Related Art

A conventional Internet TV system, for example, an Internet Protocol TV (IPTV) system, may broadcast a maximum of several hundred broadcast channels, and thus, each Internet TV service provider, for example, an IPTV service provider (IPTV SP) may provide several dozen channels. Accordingly, a user may waste time to find a desired channel Also, the Internet TV service provider may not accurately identify a receiver, and thus, may not appropriately provide, to the user, personalized advertisement and a personalized program guide, for example, a personalized electronic program guide (EPG).

Therefore, the Internet TV service provider may desire a method that may easily identify an individual to provide an improved service by providing a service based on the individual. A fingerprint identifying method, a data processing method, an EPG configuring method, and the like may be included in a related art of a method of providing a personalized service.

SUMMARY

According to an aspect of the present invention, there is provided a set-top box, and the set-top box includes a fingerprint scanner to scan a fingerprint, a controller to identify identification information associated with a user based on the scanned fingerprint, a transceiver to transmit the identified identification information to an Internet TV service providing server, and to receive, from the Internet TV service providing server, a personalized program guide corresponding to the transmitted identification information, and a providing unit to provide the received personalized program guide to an Internet TV set.

The fingerprint scanner may request the user to scan a fingerprint when a power is provided to the Internet TV set, and the controller may compare the fingerprint scanned in response to the request with a fingerprint stored in a storage unit to identify identification information associated with the user.

The fingerprint scanner may be included in a remote controller, and the remote controller may transmit fingerprint scan data associated with the scanned fingerprint to the set-top box through a signal transmission module. In this case, when the fingerprint scan data transmitted through the remote controller is not stored in a storage unit, a registration unit may request personal information from the user, may set a view authority using the personal information inputted in response to the request, and may register, as the identification information, the personal information, the view authority, and a personal identifier to be associated with the fingerprint scan data.

According to an aspect of the present invention, there is provided a personalized program providing method, and the method includes identifying identification information associated with a user by scanning a fingerprint using a fingerprint scanner, transmitting the identified identification information to an Internet TV service providing server, receiving a personalized program guide corresponding to the transmitted identification information through the Internet TV service providing server, and providing the transmitted personalized program guide through an Internet TV set.

Additional aspects, features, and/or advantages of the invention will be set forth in part in the description which follows and, in part, will be apparent from the description, or may be learned by practice of the invention.

Effect

According to an embodiment of the present invention, there is provided a method and system that may easily identify a user of an Internet TV, may store, in a database, a view history, a purchase history, a search history, and the like for each individual by utilizing an obtained personal identifier, may analyze statistics to generate a personalized advertisement and a personalized program guide, and may transmit the generated personalized advertisement and the personalized program guide, and thus, the user may conveniently select a preferred channel using the personalized program guide and may conduct shopping based on the personalized advertisement.

According to an embodiment, an Internet TV service providing server may provide a relatively accurate personalized advertisement to maximize an advertisement effect, and a set-top box may provide various services based on identification information such as a personal video recorder (PVR) and the like, and a set-top box identifier. Fingerprint data may be stored in the set-top box, and the set-top box may transmit only the identification information and the set-top box identifier to the Internet TV service providing server, and may prevent a leak of personal biometric information of a user.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1:
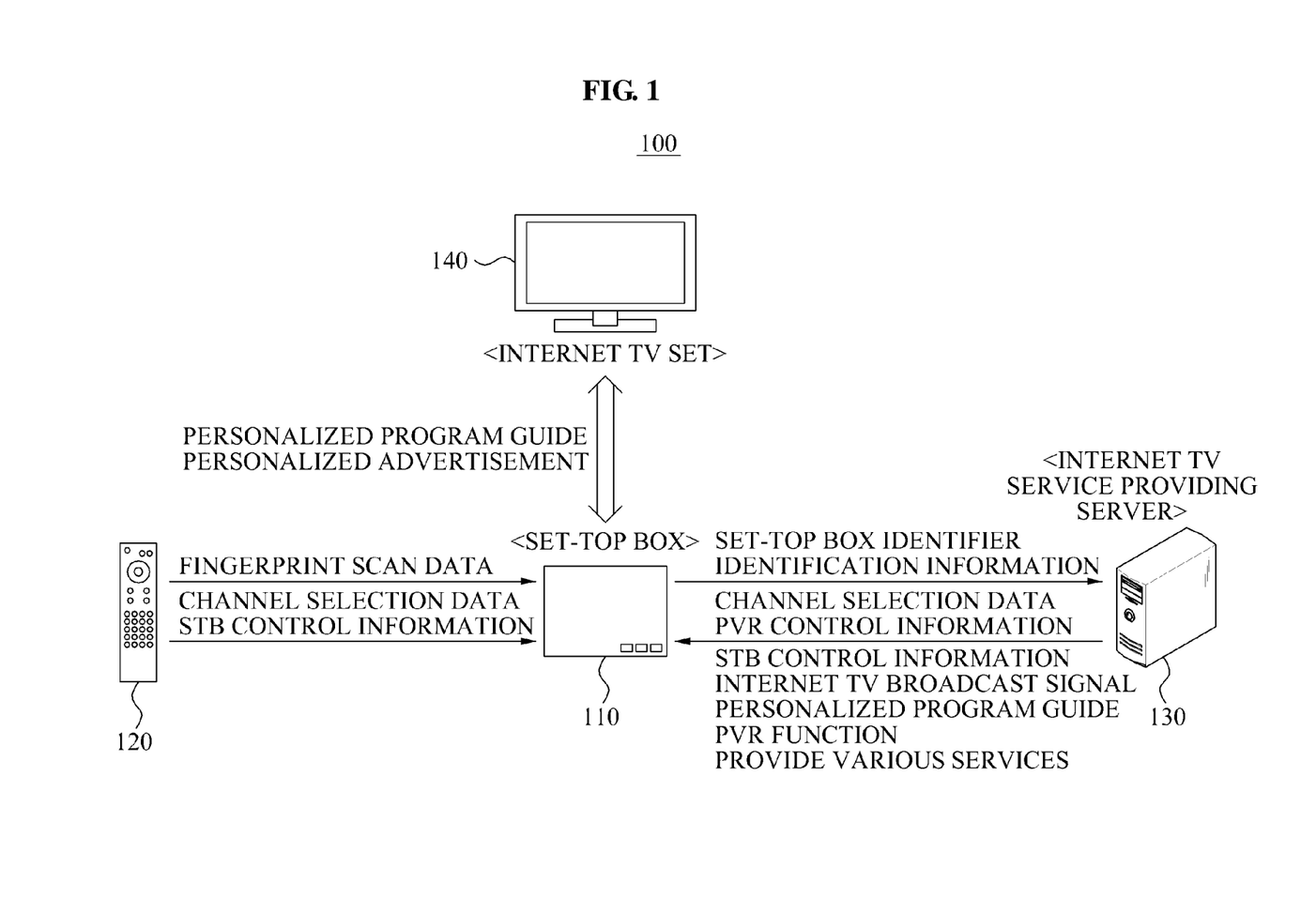
FIG. 1 is a diagram illustrating a network of a personalized program providing system according to an embodiment of the present invention.

FIG. 1 illustrates a network of a personalized program providing system according to an embodiment of the present invention.

Referring to FIG. 1, the personalized program providing system 100 may include a set-top box 110, a remote controller 120, an Internet TV service providing server 130, and an Internet TV set 140.

The set-top box 110 may scan a fingerprint through a fingerprint scanner to identify identification information associated with a user. The fingerprint scanner may be included in the set-top box 110 or may be included in a set-top box remote controller or an Internet TV set remote controller.

When the Internet TV set 140 is turned on, fingerprint identification is requested from the user through a screen of the Internet TV set 140. When the user puts a finger on the remote controller 120 in response to the request, the fingerprint scanner included in the remote controller 120 may scan a fingerprint of the user. The scanned fingerprint may be transmitted, as fingerprint scan data, to the set-top box 110 through the remote controller 120. The remote controller 120 may transmit the fingerprint scan data with respect to the scanned fingerprint to the set-top box 110 or may transmit channel selection data or set-top box (STB) control information to the set-top box 110.

The set-top box 110 may compare the transmitted fingerprint data with fingerprint scan data stored in a storage unit to identify the identification information associated with the user. The identification information may include personal information of the user, such as a name, an age, a sex, and the like, a view authority, and a personal identifier. In this case, when the transmitted fingerprint scan data is not stored in the storage unit, the set-top box 110 may request the user to input personal information, may set the view authority based on the inputted personal information, and may allocate the personal identifier. The set-top box 110 may store the identification information including the personal information, the view authority, and the personal identifier together with the fingerprint scan data in the storage unit to register the fingerprint of the user.

The set-top box 110 may transmit the identified identification information to the Internet TV service providing server 130. In this case, the set-top box 110 may also transmit an identifier of the set-top box 110 and the identification information to the Internet TV service providing server 130. The set-top box 110 may transmit the identification information including the personal information, the view authority, and the personal identifier for an initial setting, and then may later transmit only the personal identifier as the identification information. The set-top box 110 may transmit the channel selection data and a PVR control signal together with the identification information to the Internet TV service providing server 130.

Internet TV service providing server 130 may transmit a personalized program guide corresponding to the transmitted identification information to the set-top box 110.

For example, the Internet TV service providing server 130 may store, in an identification information database, the personal information, the view authority, and the personal identifier included in the identification information that is transmitted for an initial setting, and, subsequently, may receive the personal identifier to extract personal information and a view authority corresponding to the received personal identifier, and may generate a personalized program guide corresponding to the extracted personal information and the view authority to transmit the generated personalized program guide to the set-top box 110. The personalized program guide, for example, a personalized Electronic Program Guide (EPG), may include a view history, a preferred channel, a recommended channel, and the like, which are the personalized information.

For another example, the Internet TV service providing server 130 may identify history information including one of a view history, a search history, and a purchase history corresponding to the transmitted identification information and the set-top box identifier, and may transmit a personalized advertisement or a personalized program guide corresponding to the identified history information to the set-top box 110. For example, the Internet TV service providing server 130 may generate the personalized program guide where a program guide associated with an adult channel is removed when the user is determined to be a minor.

Specifically, the Internet TV service providing server 130 may identify an individual using the personal information stored in the identification information database, may restrict a view, and may analyze a personal history to generate the personalized program guide and the personalized advertisement. In this case, the Internet TV service providing server 130 may analyze the personal information, the view history, the search history, the purchase history, and the like, and apply the analysis to the personalized program guide and the personalized advertisement, and when the user is the minor, may generate the personalized program guide where the adult channel is removed.

According to the present invention, a view history, a preferred channel, and a recommended channel may be provided for each individual, a view history of parents may not be provided to children, and the parents may take an action as an operator, such as restriction of content viewable by the children. The Internet TV service providing server 130 may provide an STB control signal, an Internet TV broadcast signal, a personal video recorder (PVR) function, and various services based on the identification information and the set-top box identifier.

The set-top box 110 may provide the transmitted personalized advertisement or the personalized program guide to the Internet TV set 140.

The Internet TV set 140 may display, on a screen, the transmitted personalized advertisement or the personalized program guide.

Figure 2:
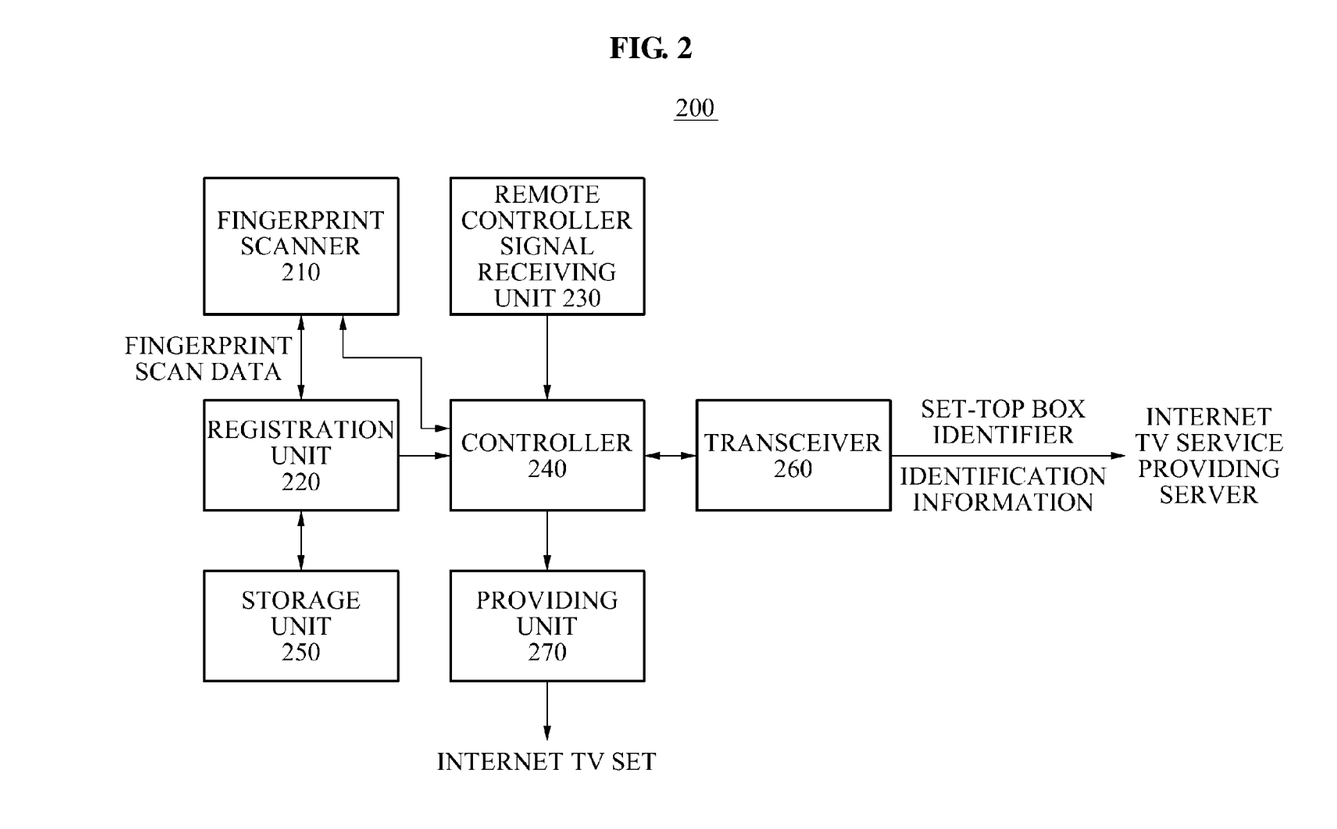
FIG. 2 is a block diagram illustrating a configuration of a set-top box according to an embodiment of the present invention.

FIG. 2 illustrates a configuration of a set-top box 200 according to an embodiment of the present invention.

Referring to FIG. 2, the set-top box 200 may include a fingerprint scanner 210, a registration unit 220, a remote controller signal receiving unit 230, a controller 240, a storage unit 250, a transceiver 260, and a providing unit 270.

A password and a fingerprint of an operator is registered when a power is provided to the set-top box 200, and subsequently, a fingerprint of a new user may be registered after obtaining a permission from the operator. In this case, the operator may be parents and the new user may be children.

The fingerprint scanner 210 may be included in the set-top box 200 or may be included in a remote controller for the set-top box 200, and may perform scanning of a fingerprint. When a power is provided to the Internet TV set 140, the fingerprint scanner 210 may request a fingerprint from a user. The user places a finger on the set-top box 200 or the remote controller in response to the request, and the fingerprint scanner 210 may scan the fingerprint. When the Internet TV set 140 is turned off and subsequently turned on, the fingerprint scanner 210 may again request scanning of the fingerprint from the user to identify a personal identifier of an individual who usually uses the Internet TV set 140. For example, the remote controller may transmit fingerprint scan data associated with the scanned fingerprint to the remote controller signal receiving unit 230 via a signal transmission module.

The remote controller signal receiving unit 230 may transmit, to the controller 240, the fingerprint scan data among signals received from the remote controller.

The controller 240 may identify identification information associated with the user using the scanned fingerprint. For example, the controller 240 may compare the transmitted fingerprint data with fingerprint data stored in the storage unit 250 to identify the identification information associated with the user.

When the fingerprint scan data transmitted via the remote controller is not registered in the storage unit 250, the registration unit 230 may register a fingerprint of a new user with a permission level by the operator. The registration unit 230 may request personal information for the new user, may set a view authority based on the personal information inputted in response to the request, and may register, in the storage unit 250, the personal information, the view authority, and a personal identifier as the identification information, to be associated with the fingerprint scan data.

The registration unit 250 may set view authorities such as a view authority for under the age of 15, a view authority for under the age of 18, a view authority for over the age of 18, and the like, and may sequentially allocate 'user 1', 'user 2', and the like, as a personal identifier. The user may register two or more different fingerprints. The registration unit 250 may not allocate a personal identifier for each fingerprint, and may allocate a personal identifier per user.

The storage unit 250 may store personal information and a view authority corresponding to each personal identifier as identification information, to be corresponding to the fingerprint data. For example, the storage unit 250 may be a non-volatile memory.

The transceiver 260 may transmit the identified identification information to the Internet TV service providing server 130. In this case, the transceiver 260 may transmit, to the Internet TV service providing server 130, the identification information including personal information, a view authority, and a personal identifier for an initial setting, and subsequently, may transmit only the personal identifier as the identification information. Therefore, the transceiver 260 may receive, from the Internet TV service providing server 130, a personalized program guide corresponding to the transmitted identification information.

In this case, the transceiver 260 may transmit, to the Internet TV service providing server 130, the personal information, the personal identifier, and a set-top box identifier with a permission of the user. A phrase associated with the permission is displayed on a screen of the Internet TV set 140 by the controller 240, and a response may be received via the remote controller or in text form. In this case, the user may set the transceiver 260 to prevent make a selection to reject a transmission of the personal information of the user and to transmit the personal identifier and the set-top box identifier. The user may not allow transmission, to the Internet TV service providing service 130, registration information associated with the user being registered in the set-top box 200. In this case, the Internet TV service providing server 130 may not be able to provide service such as the personalized advertisement or the personalized program guide which are provided based on the registration information and a use history. In this case, the fingerprint scan data of the user may only be stored in the storage unit 250 of the set-top box 200, and the transceiver 260 may not transmit the fingerprint scan data to the Internet TV service providing service 130 to protect personal biometric information.

When a fingerprint of new user is scanned while the new user is viewing the Internet TV set 140, a personal identifier is immediately changed. The transceiver 260 may restrict a view based on the changed personal identifier and may simultaneously transmit the changed personal identifier to the Internet TV service providing server 130. Therefore, the transceiver 260 may receive, from the Internet TV service providing server 130, a personalized advertisement, a personalized program guide, and a PVR function which are appropriate for the changed personal identifier.

For example, the transceiver 260 may transmit a set-top box identifier together with the identified identification information to the Internet TV service providing server 130, and may receive, from the Internet TV service providing server 130, a personalized advertisement or a personalized program guide corresponding to one of a view history, a search history, and a purchase history corresponding to the transmitted identified identification information and the set-top box identifier. The set-top box identifier may be an identifier (ID) that is allocated to the set-top box 200, and, when only the personal identifier is transmitted as the identification information, the set-top box identifier may be used by the Internet TV service providing server 130 to identify the personalized advertisement or the personalized program guide appropriate for the user.

The providing unit 270 may provide the received personalized program guide to the Internet TV set 140. For example, the providing unit 270 may provide the received personalized advertisement or the personalized program guide to the Internet TV set 140, and may display the personalized advertisement or the personalized program guide on the screen of the Internet TV set 140.

Figure 3:
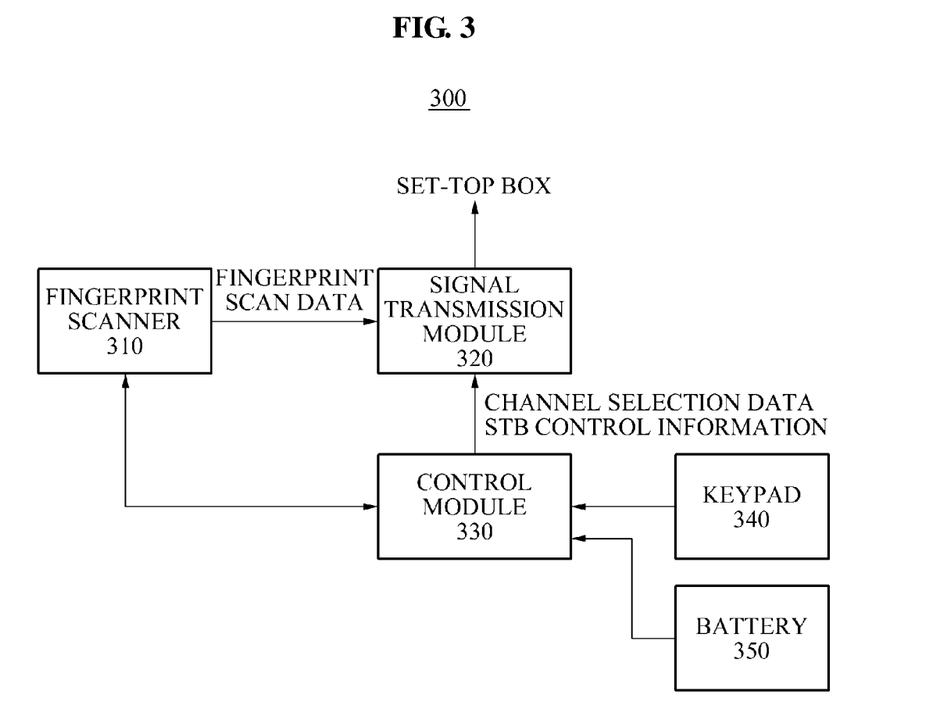
FIG. 3 is a block diagram illustrating a configuration of a remote controller according to an embodiment of the present invention.

FIG. 3 illustrates a configuration of a remote controller 300 according to an embodiment of the present invention.

Referring to FIG. 3, the remote controller 300 may include a fingerprint scanner 310, a signal transmission module 320, a control module 330, a keypad 340, and a battery 350.

The fingerprint scanner 310 may request a fingerprint from a user every time that the Internet TV set 140 is turned on. The fingerprint scanned in response to the request may be transmitted to the signal transmission module 320.

The signal transmission module 320 may transmit fingerprint data associated with the scanned fingerprint to the set-top box 200. In this case, the signal transmission module 320 may be a Bluetooth transceiver, an infrared ray transceiver, and the like.

The control module 330 may transmit, to the set-top box 200, STB control information and channel selection data inputted from the keypad 340 via the signal transmission module 320.

Figure 4:
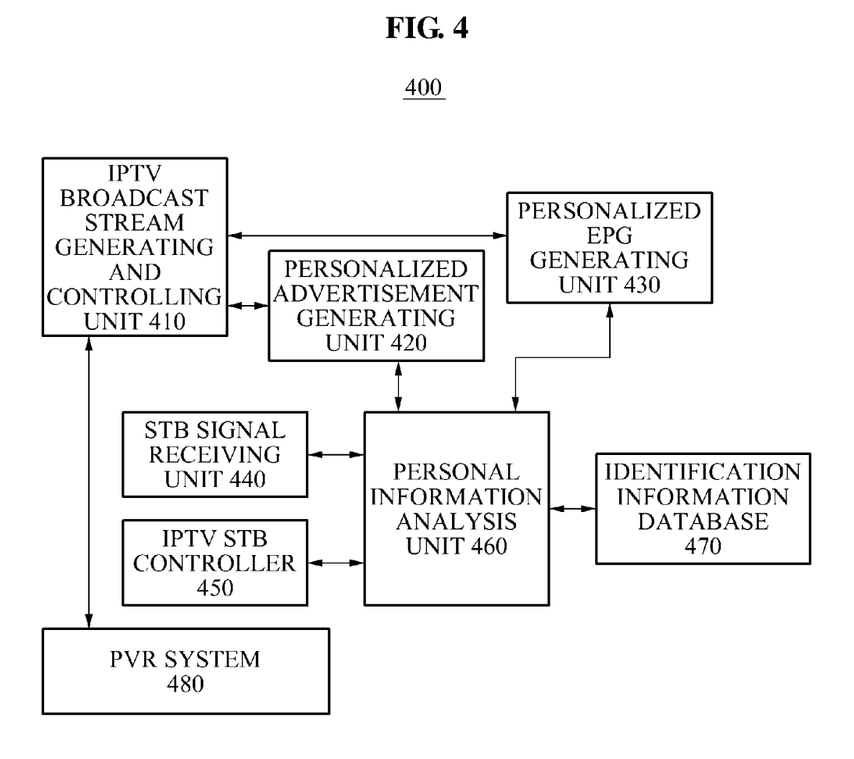
FIG. 4 is a diagram illustrating a configuration of an Internet TV service providing server according to an embodiment of the present invention.

FIG. 4 illustrates a configuration of an Internet TV service providing server 400 according to an embodiment of the present invention.

Referring to FIG. 4, the Internet TV service providing server 400 may include an IPTV broadcast stream generating and controlling unit 410, a personalized advertisement generating unit 420, a personalized EPG generating unit 430, an STB receiving unit 440, and IPTV STB controller 450, a personalized information analysis unit 460, an identification information database 470, and a PVR system 480.

When personal information, a personal identifier, and a set-top box identifier are received for an initial setting, the STB receiving unit 440 may obtain a user's agreement with respect to personal information usage and may register the personal information, the personal identifier, and the set-top box identifier in the identification information database 470. Subsequently, the STB receiving unit 440 may receive the personal identifier and the set-top box identifier.

The personal information analysis unit 460 may search the identification information database 470 using the personal identifier and the set-top box identifier, and may analyze the personal information and one history information among a view history, a search history, and a purchase history. The analyzed information may be used for generating a personalized advertisement or a personalized program guide appropriate for the user.

Specifically, the personalized advertisement generating unit 420 may generate the personalized advertisement based on the personal information and information such as the view history, the search history, the purchase history of the user, and the like.

The personalized EPG generating unit 430 may generate the personalized program guide based on the personal information and the information such as the view history, the search history, the purchase history of the user, and the like.

The IPTV broadcast stream generating and controlling unit 410 may apply the generated personalized advertisement and the personalized program guide to a program.

The IPTV STB controller 450 may transmit the generated personalized advertisement and the personalized program guide to the set-top box 200.

The PVR system 480 may identify the personal identifier and the set-top box identifier to provide a PVR service appropriated for the identified personal identifier and the identified set-top box identifier.

A personal program guide, a personal advertisement, and a PVR function may be merely a few non-limiting examples of services that may be provided based on the personal identifier and the set-top box identifier. One of the personal program guide, the personal advertisement, and the PVR function may only be provided or all the three services may be simultaneously provided. Subsequently, various services based on the personal identifier and the set-top box identifier may be provided.

Figure 5:
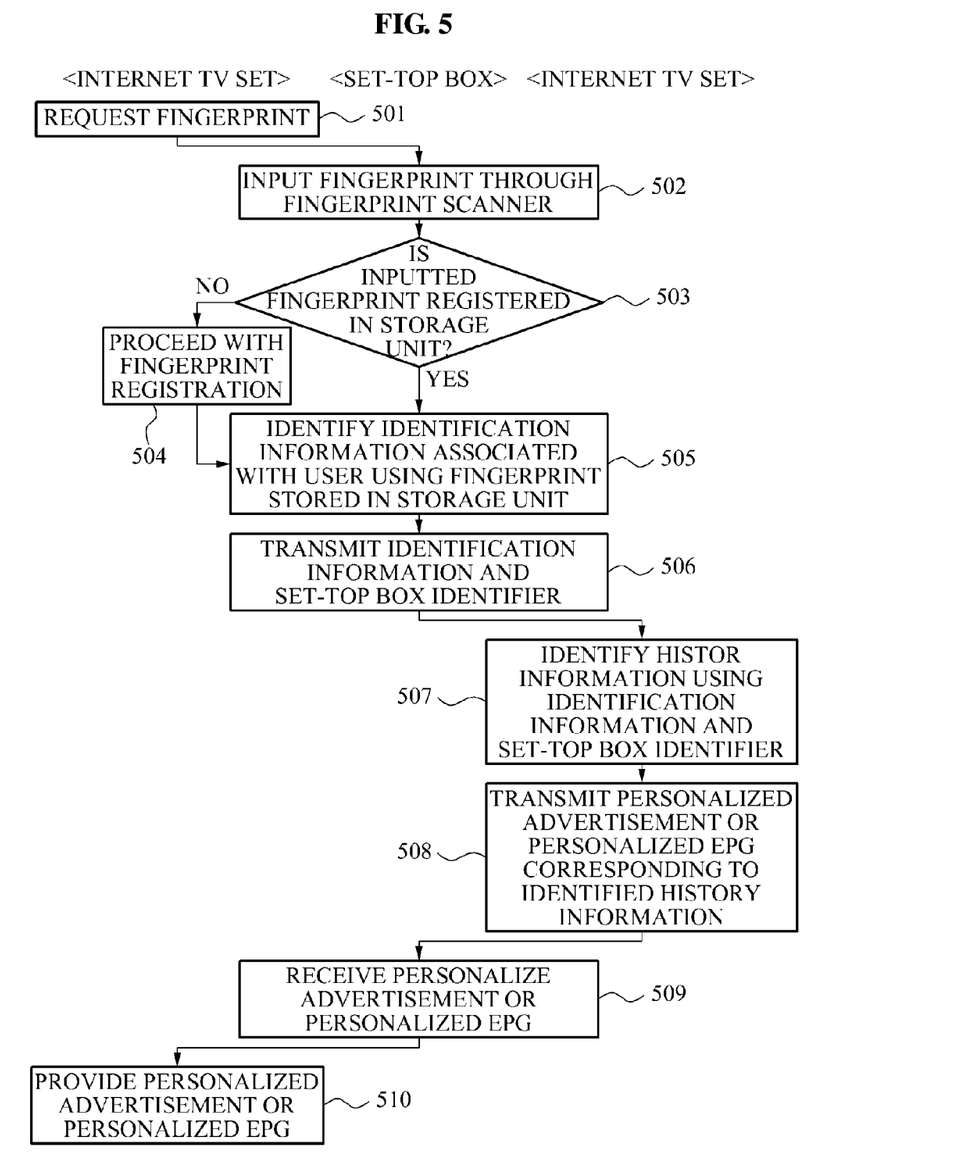
FIG. 5 is a flowchart illustrating a personalized program providing method according to an embodiment of the present invention.

FIG. 5 illustrates a personalized program providing method according to an embodiment of the present invention.

In operation 501, a request for a user's fingerprint is automatically displayed on a screen by the fingerprint scanner 210 when a power is provided to the Internet TV set 140. In this case, a power of the set-top box 200 may simultaneously be provided.

In operation 502, the set-top box 200 receives a fingerprint inputted from the user through the fingerprint scanner 210.

In operation 503, the set-top box 200 determines whether the inputted fingerprint is registered in the storage unit 250.

When the determining in operation 503 determines that the fingerprint is not registered, the set-top box 200 proceeds with a 'fingerprint registration' in operation 504, the 'fingerprint registration' including an operation of requesting personal information from the user, an operation of setting a view authority based on the personal information, and an operation of registering the personal information, the view authority, and a personal identifier as the identification information, to be associated with the fingerprint scan data.

When the determining in operation 503 determines that the fingerprint is registered, the set-top box 200 in step 505 may identify identification information associated with the user using the fingerprint stored in the storage unit 250.

In operation 506, the set-top box 200 transmits the identified indication information and a set-top box identifier to the Internet TV service providing server 400.

In operation 507, the Internet TV service providing server 400 identifies history information including one of a view history, a search history, and a purchase history corresponding to the transmitted identification information and the set-top box identifier.

In operation 508, the Internet TV service providing server 400 transmits a personal advertisement or a personal program guide, for example a personal EPG, corresponding to the identified history information, and transmits the generated the personalized advertisement or the personalized program guide to the set-top box 200.

In operation 509, the set-top box 200 provides the transmitted personalized advertisement or the personalized program guide to the Internet TV set 140.

In operation 510, the Internet TV set 140 displays the personalized advertisement or the personalized program guide on the screen.

The personalized program providing system described with reference to FIGS. 1 through 4 may be applicable to the personalized program providing method illustrated in FIG. 5, and thus, detailed descriptions thereof are omitted.

The method according to the above-described embodiments of the present invention may be recorded in non-transitory computer readable media including program instructions to implement various operations embodied by a computer. The media may also include, alone or in combination with the program instructions, data files, data structures, and the like. Examples of non-transitory computer readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A system including a set-top box and an Internet TV service providing server, the system comprising:
   a fingerprint scanner to scan a fingerprint of a user;
   a storage unit, included in the set-top box, for storing fingerprints and units of identification information, each stored fingerprint corresponding to one of the units of identification information;
   a controller, included in the set-top box, that matches the scanned fingerprint with one of the stored fingerprints, the controller identifying the unit of identification information corresponding to the one stored fingerprint, wherein the identified unit of identification information is a personal identifier that is not the scanned fingerprint;

a transceiver, included in the set-top box, to transmit only the identified unit of identification information to the Internet TV service providing server to identify the user so that the Internet TV service providing server does not store any fingerprint corresponding to the user, and to receive, from the Internet TV service providing server, a personalized program guide corresponding to the transmitted identification information; and a providing unit, included in the set-top box, to provide the received personalized program guide to an Internet TV set.

2. The system of claim 1, wherein:
the fingerprint scanner requests the user to scan a fingerprint when a power is provided to the Internet TV set.

3. The system of claim 1, further comprising a remote controller including a signal transmission module, wherein:
the fingerprint scanner is included in the remote controller, and the remote controller scans another fingerprint of another user and transmits fingerprint scan data associated with the another scanned fingerprint to the set-top box through the signal transmission module, and the set-top box further comprises a registration unit to request personal information from the another user, to set a view authority using the personal information inputted in response to the request, and to register, as the identification information, the personal information, the view authority, and a personal identifier to be associated with the another fingerprint scan data, when the another fingerprint scan data transmitted through the remote controller is determined by the controller to not be stored in the storage unit.

4. The system of claim 1, wherein:
the transceiver transmits, to the Internet TV service providing server, a set-top box identifier with the identified identification information, and receives, from the Internet TV service providing server, a personalized advertisement or a personalized program guide corresponding to one of a view history, a search history, and a purchase history corresponding to the transmitted identification information and the set-top box identifier, and the providing unit provides, to the Internet TV set, the received personalized advertisement or the personalized program guide.

5. A method of providing a personalized program, the method comprising:
scanning a fingerprint of a user using a fingerprint scanner;
matching the scanned fingerprint with a fingerprint stored in a storage unit of a set-top box;
at the set-top box, identifying identification information that corresponds to the stored fingerprint, wherein the identification information is a personal identifier that is not the scanned fingerprint;
transmitting only the identified identification information from the set-top box to an Internet TV service providing server to identify the user so that the Internet TV service providing server does not store any fingerprint corresponding to the user;

receiving a personalized program guide corresponding to the transmitted identification information through the Internet TV service providing server; and providing the transmitted personalized program guide through an Internet TV set.

6. The method of claim 5, wherein the identifying comprises:
requesting the user to scan the fingerprint when a power is provided to the Internet TV set.

7. The method of claim 5, wherein:
the receiving comprises receiving the personalized program guide or a personalized advertisement corresponding to one of a view history, a search history, and a purchase history corresponding to the transmitted identification information, and the providing comprises providing the received personalized advertisement or the personalized program guide through the Internet TV set.

8. A method of providing a personalized program, the method comprising:
scanning a fingerprint of a user using a fingerprint scanner;
matching the scanned fingerprint with a fingerprint stored in a storage unit of a set-top box;
determining identification information that corresponds to the stored fingerprint, the identification information including personal information that includes a name of the user, an age of the user and a sex of the user, the identification information further including a personal identifier for the user, the identification information not including the scanned fingerprint;
displaying a phrase associated with permission to transmit all of the identification information to an Internet TV service providing server;
receiving a response from the user indicating whether the permission is granted or denied;
if the response indicates that the permission is granted,
transmitting all of the identification information to an Internet TV service providing server;
receiving a personalized program guide corresponding to the transmitted identification information through the Internet TV service providing server; and
providing the transmitted personalized program guide through an Internet TV set; and
if the response indicates that the permission is denied,
preventing transmission of the personal information to the Internet TV service providing server; and
transmitting the personal identifier to the Internet TV service providing server.

9. The method of claim 8, wherein the permission is granted.

10. The method of claim 8, wherein the permission is denied.

11. The method of claim 8, wherein
the personal information consists of the name, the age and the sex, and
the personal identifier is different from the name, the age and the sex.

* * * * *